(12) United States Patent
Lugg (10) Patent No.: US 10,344,613 B2
(45) Date of Patent: Jul. 9, 2019

(54) HYPERJET SUPERCONDUCTING TURBINE BLISK PROPULSION AND POWER GENERATION

(71) Applicant: Richard H. Lugg, Cape Elizabeth, ME (US)

(72) Inventor: Richard H. Lugg, Cape Elizabeth, ME (US)

(73) Assignee: Sonic Blue Aerospace, Inc., Portland, ME (US)

(*) Notice: Subject to any disclaimer, the term of this patent is extended or adjusted under 35 U.S.C. 154(b) by 0 days.

(21) Appl. No.: 15/093,706

(22) Filed: Apr. 7, 2016

(65) Prior Publication Data

US 2016/0298538 A1 Oct. 13, 2016

Related U.S. Application Data

(60) Provisional application No. 62/178,358, filed on Apr. 7, 2015.

(51) Int. Cl.

| | |
|---|---|
| *F01D 15/10* | (2006.01) |
| *H01F 6/00* | (2006.01) |
| *H01F 6/04* | (2006.01) |
| *F01D 5/34* | (2006.01) |
| *F02K 3/06* | (2006.01) |
| *F02K 7/10* | (2006.01) |
| *F02C 3/113* | (2006.01) |

(52) U.S. Cl.
CPC .............. *F01D 15/10* (2013.01); *F01D 5/34* (2013.01); *F02C 3/113* (2013.01); *F02K 3/06* (2013.01); *F02K 7/10* (2013.01); *H01F 6/00* (2013.01); *F05D 2220/76* (2013.01); *F05D 2220/764* (2013.01); *F05D 2260/20* (2013.01); *F05D 2300/507* (2013.01); *Y02T 50/673* (2013.01); *Y02T 50/676* (2013.01)

(58) Field of Classification Search
None
See application file for complete search history.

(56) References Cited

U.S. PATENT DOCUMENTS 5,513,498 A * 5/1996 Ackermann .......... F25B 25/005
62/51.1
6,397,577 B1 * 6/2002 Sondergaard ............. F01D 5/03
415/79

(Continued)

*Primary Examiner* — Tulsidas C Patel
*Assistant Examiner* — S. Mikailoff
(74) *Attorney, Agent, or Firm* — Maine Cernota & Rardin (57) ABSTRACT

A turbine assembly system and apparatus for a Hyperjet™ and method for making same is provided. Specifically, the turbine assembly provides a power generation system for a turbine engine and includes a plurality of stages. Each stage of the turbine assembly includes a stator having a wire distributed winding; and a rotatable blisk that encircle the stator with an air gap disposed therebetween. The rotatable blisk includes a rotor disk and a plurality of blades that extend radially outward from the rotor disk. The rotor disk includes six superconducting magnets positioned in a circular arrangement within the rotor disk to encircle the stator. An electromagnetic field providing high power and power density is generated between the superconducting magnets and the stator with the blisk rotates about the stator during engine operation.

2 Claims, 12 Drawing Sheets

(56) References Cited

U.S. PATENT DOCUMENTS

| | | | | |
|---|---|---|---|---|
| 6,882,068 B2* | 4/2005 | Weeber | | H02K 9/12 310/59 |
| 7,417,334 B2* | 8/2008 | Uchiyama | | F03D 3/02 290/44 |
| 7,425,772 B2* | 9/2008 | Novo Vidal | | F03B 13/083 290/52 |
| 7,944,069 B2* | 5/2011 | Uchiyama | | F03D 3/02 290/44 |
| 8,222,762 B2* | 7/2012 | Borgen | | B63H 13/00 290/44 |
| 9,180,770 B1* | 11/2015 | Lugg | | B60K 3/04 |
| 9,181,900 B1* | 11/2015 | Lugg | | F02K 5/00 |
| 2004/0066099 A1* | 4/2004 | Weeber | | H02K 9/12 310/58 |
| 2007/0040385 A1* | 2/2007 | Uchiyama | | F03D 3/02 290/44 |
| 2007/0102934 A1* | 5/2007 | Pescarmona | | F03D 1/0658 290/44 |
| 2008/0150287 A1* | 6/2008 | Kern | | F01D 15/10 290/52 |
| 2011/0031760 A1* | 2/2011 | Lugg | | F03D 1/025 290/55 |
| 2012/0211990 A1* | 8/2012 | Davey | | F03B 13/264 290/54 |
| 2012/0217831 A1* | 8/2012 | Jore | | H02K 1/30 310/90 |
| 2013/0094963 A1* | 4/2013 | Rolt | | B64D 27/02 416/1 |
| 2013/0104570 A1* | 5/2013 | Stautner | | G01R 33/3804 62/45.1 |
| 2014/0060005 A1* | 3/2014 | Lugg | | F01D 15/10 60/226.3 |
| 2014/0353971 A1* | 12/2014 | Davey | | F03B 11/06 290/52 |
| 2015/0050123 A1* | 2/2015 | Lugg | | F01D 15/10 415/66 |
| 2016/0186570 A1* | 6/2016 | Lugg | | F01D 5/02 416/3 |
| 2016/0298538 A1* | 10/2016 | Lugg | | F01D 5/34 |
| 2018/0062484 A1* | 3/2018 | Martinez Fernandez | | H02K 3/02 |

* cited by examiner

Disk Design Data of HYPERJET Turbine Stage #1

| Parameter | Symbol | SI | | USCS | |
|---|---|---|---|---|---|
| Axial Length | $L_1$ | 150 | mm | 5.91 | in |
| Diameter | $D_1$ | 628 | mm | 24.7 | in |
| Rim Height | $hg_1$ | 62.8 | mm | 2.47 | in |
| Hole Diameter | $d_H1$ | 306 | mm | 12.1 | in |
| Area | $A_1$ | 0.999 | $m^2$ | 1550 | $in^2$ |
| Volume | $V_1$ | 0.0345 | $m^2$ | 2110 | $in^2$ |

Disk Design Data of HYPERJET Turbine Stage #2

| Parameter | Symbol | SI | | USCS | |
|---|---|---|---|---|---|
| Axial Length | $L_2$ | 175 | mm | 6.89 | in |
| Diameter | $D_2$ | 676 | mm | 26.6 | in |
| Rim Height | $hg_2$ | 67.6 | mm | 2.66 | in |
| Hole Diameter | $d_H2$ | 306 | mm | 12.1 | in |
| Area | $A_2$ | 1.28 | $m^2$ | 1980 | $in^2$ |
| Volume | $V_2$ | 0.0521 | $m^2$ | 3170 | $in^2$ |

Disk Design Data of HYPERJET Turbine Stage #3

| Parameter | Symbol | SI | | USCS | |
|---|---|---|---|---|---|
| Axial Length | $L_3$ | 200 | mm | 7.87 | in |
| Diameter | $D_3$ | 771 | mm | 30.4 | in |
| Rim Height | $hg_3$ | 77.1 | mm | 3.04 | in |
| Hole Diameter | $d_H3$ | 306 | mm | 12.1 | in |
| Area | $A_3$ | 1.72 | $m^2$ | 2670 | $in^2$ |
| Volume | $V_3$ | 0.0826 | $m^2$ | 5020 | $in^2$ |

Disk Design Data of HYPERJET Turbine Stage #4

| Parameter | Symbol | SI | | USCS | |
|---|---|---|---|---|---|
| Axial Length | $L_4$ | 225 | mm | 8.86 | in |
| Diameter | $D_4$ | 893 | mm | 35.2 | in |
| Rim Height | $hg_4$ | 89.3 | mm | 3.52 | in |
| Hole Diameter | $d_H4$ | 306 | mm | 12.1 | in |
| Area | $A_4$ | 2.24 | $m^2$ | 3480 | $in^2$ |
| Volume | $V_4$ | 0.124 | $m^2$ | 7600 | $in^2$ |

HYPERJET SUPERCONDUCTING TURBINE BLISK PROPULSION AND POWER GENERATION

CROSS-REFERENCE TO RELATED APPLICATIONS

This application claims priority to U.S. Provisional Patent Application Ser. No. 62/178,358, filed on Apr. 7, 2015, entitled "Hyperjet Superconducting Turbine Blisk Propulsion and Power Generation," the contents of which are herein incorporated by reference in their entirety.

FIELD OF THE INVENTION

The present invention relates to a system, method, an apparatus, among other things, for a turbine assembly. More specifically, the present invention relates to a turbine engine that provides a shaftless turbine design to facilitate a superconducting electrically driven engine to drive multi-engine cycle performance.

BACKGROUND

Gas turbine engines, and the devices that are powered by gas turbine engines, are limited in overall design and performance by mechanical, material, and thermodynamic laws. They are further constricted by the design limitations of the three elements that make up the baseline design of gas turbine engines: the compressor, the combustor and the turbine. In turbines for aircraft, these three engine sections are contained inside of the outer turbine casing and are centered on a load bearing drive shaft that connects the turbine (on the rearward portion of the drive shaft) with the compressor (on the forward portion of the drive shaft). Typically the drive shaft is a twin or triple spool design, consisting of two or three concentric rotating shafts nested one inside the other. The different spools allow the turbine assembly and the compressor assembly, each of which is connected to one of the spools of the drive shaft, to rotate at different speeds.

The turbine is optimized to run at one particular speed for combustion and thrust processes, and the compressor is optimized at a different speed to more efficiently compress incoming air at the inlet face and raise the air pressure to a significant point to where there is a pressure ratio differential, significant enough to provide combustion. Highly compressed air at ratios of 30:1 to 40:1 ignites when mixed with atomized fuel in the combustor. The difference in speeds of the spools is typically accomplished by reduction gears to accommodate the required speeds for combustion and propulsion operation.

The compressor assembly consists of numerous compressor stages, each of which is made up of a rotor and a diffuser, the number of stages dependent upon the total pressure ratio increase required to achieve combustion and produce the desired thrust. The rotor is a series of rotating airfoil blades, or fans (attached to the shaft), which converge the air, i.e., compressing the volume of air and increasing its velocity, on the intake side of the blade, by passing it into a smaller volumes (convergent channels between airfoil rotor blades) in each the rotor chamber. Adjacent to each rotor is a diffuser (or stator). The diffuser is a fixed, non-rotating disc of airfoil stators whose sole purpose is to reduce the air velocity from the rotor and increase the pressure. The diffuser slows the air down by passing it through divergent (expanding) channels between the airfoil stators, thus recovering the pressure.

Upon entering the diffuser the air passes from a narrow opening on the intake side of the diffuser into a gradually enlarging chamber (diffuser) that slows the velocity and raises the pressure of the air. Each compressor stage is made up of a compressor rotor and a diffuser (stator) disc. There are as many stages of the compressor as are required to get the air to the required air temperature and compression ratio (in high performance aircraft turbines usually in between 12:1 to 30:1 dependent on combustor design, flight and speed envelope and turbine thrust requirements prior to entering the combustor.

In the combustor, the high pressure, high temperature, expanding air mixes in a swirl of hot vaporized fuel and ignites to form a controllable flame front. The flame front expands as it combusts, rotating and driving turbine blades as the flame front exits the engine. The turbine assembly consists of several sets of rotating turbine blades connected to the drive shaft and angled so that the thrust of the flame front causes the blades to rotate. The turbine blades, being connected to the drive shaft, cause the drive shaft to rotate and thus the compressor blades to rotate, consequently more air is compressed and the cycle starts all over again.

However, existing turbine designs are limited by their implementation of such drive shafts and, accordingly, there needs to be a movement of towards using and designing "shaftless" turbine engine systems. It is expected that future U.S. air dominance will see a proliferation of hypersonic propulsion systems and vehicles to power effectively and efficiently high speed strike weapons. Speed is rapidly becoming the new stealth, providing drastically reduced time-to-target for near real-time action in theatre and a very low probability of intercept. As the threats faced by the U.S. military push friendly forces further away from high value targets, the air war will require speeds in the range of Mach 5.0-8.0, to ensure timely and effective strike in an anti-access/area denial environment.

SUMMARY

Accordingly, an embodiment of Hyperjet™ is a small long-range/stand-off vehicle powered by the hypersonic propulsion system Hyperjet™ and of which is an efficient air-breather combining multi engine cycles, and for which at its core is a first stage engine cycle (Mach 1.0 to Mach 4.0) turbomachinery system is shaftless. Generally, shaftless systems enable the propulsion system to work as a turbofan at low altitudes, low speed and a ramjet/scramjet at high altitudes and high speed. It is a completely electrically segmented architecture: turbine core, compressor, and bypass fan, with a hollow core acting as a superconducting corridor to move high energy density electric power to operate the segmented stages electrically with superconducting generators and motors.

According to the invention described herein, mission assurance is achieved with sufficient electric power to segment a multi-engine cycle, shaftless electric architecture, providing unprecedented gains in thermal propulsive and efficiency gains greater than 65% end to end. Embedded electric power generation at the multi-megawatt level further achieves plasma combustion, virtual cowl and shock train control, and electric supercruise with embedded MHD drive, and electromagnetic drag reduction technology (EDRT) control, defining airfoil flow control, bypass air and compressor mass flow control.

According to the example embodiment, the proposed propulsion system generates not only a large amount of power, but a large specific power and power density as well.

More particular, the turbine engine disclosed herein provides shaftless turbine design facilitating superconducting electrically driven engine to drive multi-engine cycle performance, a turbofan-turbojet-ramjet-scramjet engine with single flow path segmentation separation mechanically and thermally and electrically driven independently, counter-rotation is independent, thermally tuned stages, and reduced EM drag, i.e., plasma generated to develop the virtual cowl.

An embodiment of the present invention provides for a turbine assembly for a Hyperjet™. Specifically, for example, the turbine assembly provides a power generation system for a turbine engine and includes a plurality of stages. In an embodiment, each stage of the turbine assembly includes a stator having a wire distributed winding; and a rotatable blisk that encircle the stator with an air gap disposed therebetween. In an embodiment, the rotatable blisk includes a rotor disk and a plurality of blades that extend radially outward from the rotor disk. In an embodiment, the rotor disk includes six superconducting magnets positioned in a circular arrangement within the rotor disk to encircle the stator. In an embodiment, an electromagnetic field providing high power and power density is generated between the superconducting magnets and the stator with the blisk rotates about the stator during engine operation.

An embodiment of the present invention provides a power generation system for a turbine engine. According to the embodiment, the system includes a stator having a wire distributed winding; and a rotatable blisk encircling the stator with an air gap disposed therebetween, the rotatable blisk including a rotor disk and a plurality of blades extending radially outward from the rotor disk, wherein the rotor disk includes a plurality of superconducting magnets disposed in a circular arrangement within the rotor disk to encircle the stator.

An embodiment of the present invention provides that the wire distributed winding of the stator generates an electromagnetic field with the plurality of superconducting magnets when the rotatable blisk rotates about the stator.

An embodiment of the present invention provides that the plurality of blades each comprise airfoil cross-sectional shape such that the rotatable blisk rotates about the stator when heated air output from a combustor of the power generation system is forced through the plurality of blades.

An embodiment of the present invention provides that the rotor disk further includes a vacuum chamber encapsulating the plurality of superconducting magnets.

An embodiment of the present invention provides that the power generation system includes a cooling system configured to generate a coolant to be injected into the vacuum chamber.

An embodiment of the present invention provides a plurality of rod support structures configured to suspend the plurality of superconducting magnets, respectively, in the vacuum chamber.

An embodiment of the present invention provides that the stator and the rotatable blisk each comprise a plurality of magnets that are coupled to one another when the rotatable blisk rotates about the stator to position the rotatable blisk relative to the stator with the air gap disposed therebetween.

An embodiment of the present invention provides a turbine assembly that includes a first stage having a first stator with a wire distributed winding, and a first rotatable blisk encircling the first stator with an air gap disposed therebetween, the first rotatable blisk including a first rotor disk and a first plurality of blades extending radially outward from the first rotor disk, wherein the first rotor disk includes a first plurality of superconducting magnets disposed in a circular arrangement within the first rotor disk to encircle the first stator, and wherein the first plurality of blades each comprise a first airfoil cross-sectional shape such that the first rotatable blisk rotates in a first direction about the first stator when heated air output from a combustor of the power generation system is forced through the first plurality of blades. Moreover, a second stage having a second stator with a wire distributed winding, and a second rotatable blisk encircling the second stator with an air gap disposed therebetween, the second rotatable blisk including a second rotor disk and a second plurality of blades extending radially outward from the second rotor disk, wherein the second rotor disk includes a second plurality of superconducting magnets disposed in a circular arrangement within the second rotor disk to encircle the second suitor, and wherein the second plurality of blades each comprise a second airfoil cross-sectional shape such that the second rotatable blisk rotates in a second direction about the second stator when heated air output from a combustor of the power generation system is forced through the second plurality of blades, the second direction being a counter direction to the first direction.

An embodiment of the present invention provides that the respective wire distributed winding of the first and second stators generate electromagnetic fields with the first and second plurality of superconducting magnets, respectively, when each rotatable blisk rotates about the respective stator.

An embodiment of the present invention provides that the first and second rotor disks each further comprise a vacuum chamber encapsulating the respective plurality of superconducting magnets.

An embodiment of the present invention provides a cooling system configured to generate a coolant to be injected into the vacuum chambers.

The above summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and example pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

As disclosed herein, the invention provides a superconducting turbine blisk and propulsion and power generation technology. As described in detail below, the underlying technology is provided to manifest the electrification of the gas turbine to drive propulsive efficiency and create a platform to simultaneously generate multi-megawatts of power superconducting magnets ("SCM"). The commercial development of high temperature superconductors ("FITS") has advanced greatly in the past 10 years and there is now Rare Earth-Ba—Ca—Cu—O (REBCO) conductors, with sufficient critical electric current density for use in aerospace propulsion, and used in the manufacture of high performance superconducting magnets. Superconducting magnets have clear promise to provide a 5×-10× power density increase at half the weight and one-third the volume. With regard to operating at cryogenic temperatures (as low as 27 Kelvin in liquid neon is possible), maintaining this very low temperature in the magnet in close proximity to the high temperature in a turbojet, ramjet or scramjet environment poses a design challenge. Furthermore, rotating the specific engine architecture at such high RPMs associated with such jet engine forms, results in high mechanical forces.

Accordingly, the invention disclosed herein provides a small multi-pole set of superconducting magnets embedded in a turbine blisk architecture representative of a gas turbojet that can be operated at high rotational speed. The pole count in the Hyperjet™ design addresses the compressive loads while spinning at full RPMs and is of such volume, design architecture and power density to provide 1,000,000 watts of continuous AC current power within a 14.0" turbine blisk, combined with thrust up to 700 lbm. It can be scaled to meet the needed magnetic flux and power density of a subsequent full-size system. The invention allows for the safe operating stress limits of a REBCO race track geometry superconductor. Stress limits in the invention allow for interlaminar shear to be addressed. The Hyperjet™ design includes a blisk defined by a synchronous AC, six-pole superconducting machine, with the superconducting magnets in the spinning rotor blisk, and a superconducting copper (CU) cryogenic induction coil in the stator, with integrated micro-cyrocoolers providing the required 77 K cryogenic environment.

The technical approach of the disclosed invention is separated into four stages: (1) database development and design, (2) superconducting magnet manufacturing and instrumentation, (3) coil testing, and (4) data analysis and interpretation.

First for the preliminary database development and superconducting magnet design, it should be appreciated that REBCO conductors are a new technology and conductor performance varies widely between different manufacturers, and is improving on a time-scale more rapidly than the supporting literature. Thus, to ensure an accurate design, the invention is so designed to perform some key measurements to secure data that is critical to accurate design. For example, measurements are made on conductors obtained from SuperPower (U.S. manufacturing, owned by a Japanese company), SuNam (South Korean) and HTS-110 (New Zealand).

To substantiate the higher strain and compressive forces of the rotating SCM in the blisk and meet in-plane shear strengths of the REBCO superconducting ribbon, silver is replaced by copper in a sidewall of the ribbon to maximize shear strength and compressive loads which still maintain a fractureless ceramic conductor. Such embodiment has not been done before in the ribbon nor attempted in a superconducting power turbine blisk architecture. This embodiment allows for a hybrid multilayer lamination of the conductors so the in-plane shear can be a mechanical strong link, not a "weak-link" because the magnets on the blisk are spinning at high speed. This "superconducting silver strength sidewall ribbon architecture" is unique and novel of an embodiment of the present invention it provides a robust solution to this distinct architecture.

Moreover, detailed measurements of the critical current versus temperature, magnetic field and magnetic field orientation can be obtained. It is contemplated that the coil design is driven by the design of a 1,000,000 watt blisk generator, which indicates the use of a 36 cm diameter blisk. From this, the number of poles identified is six, to give 1,000,000 watts of power. The superconducting magnet design focuses on minimizing the in-plane shear, providing sufficient mechanical support, thermal management (including cryostat design), quench behavior, and counter-balancing the blisk.

In an embodiment, moreover, instrumentation can be incorporated in the design to monitor the temperature and strain within the magnet during rotational operation, with unique use of fiber optics, an emerging technology for superconducting magnet monitoring.

In an embodiment, an aspect of testing the Hyperjet™ design demonstrates that the superconducting magnets can operate under realistic conditions, which include mechanical, electrical and thermal loads. Anticipated fault conditions will be simulated in a fracture analysis for disastrous blisk failure due to high pressure compressor overload, the LP compressor driving the HP turbine in a relative gas turbine environment. Moreover, data analysis and interpretation focuses on the large volume of data obtained from the tests described above. This data can be used to validate and improve the design embodiment of the present invention. In addition, the data analysis and interpretation allows for identification of scale-up challenges, risks and required modifications. Embodiments of the Hyperjet™ blisk architecture, geometric shape and aerodynamic and thermal turbine engine configuration, with mechanical and thermal design, is shown in the accompanying drawings.

Figure 1A:
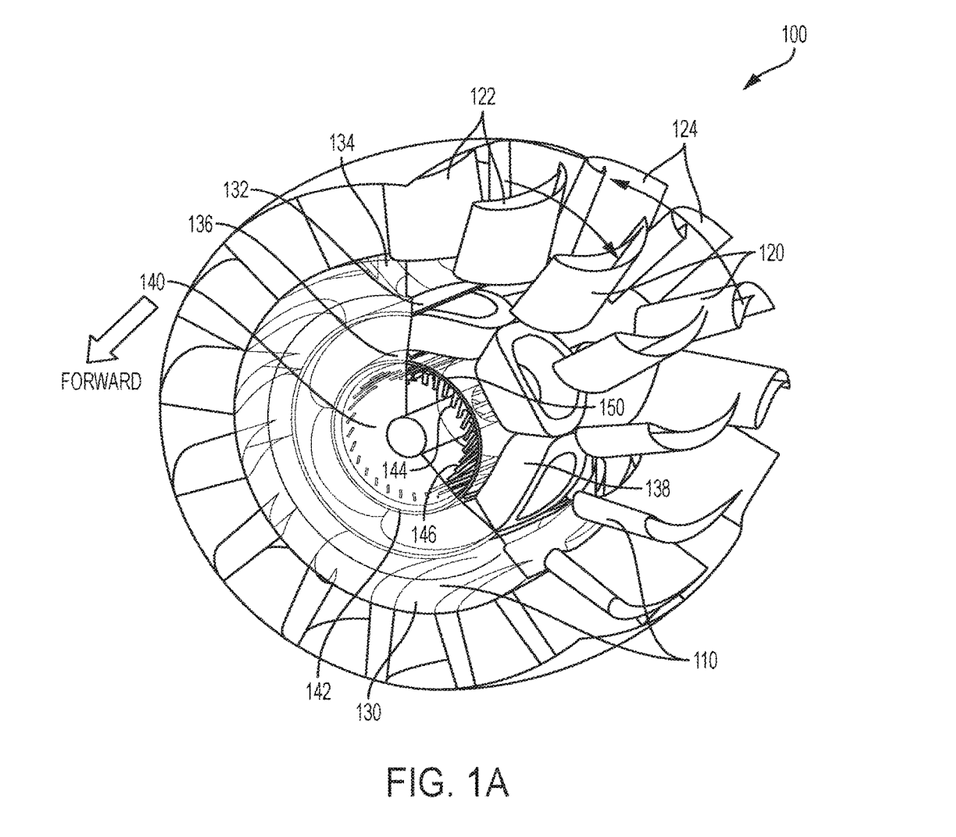
FIGS. 1A and 1B illustrate a perspective view of the turbine assembly according to an embodiment of the present invention.

FIG. 1A illustrates a perspective view of a turbine according to an example embodiment of the present invention. As shown, the turbine 100 includes a blisk 110 that is used for power generation by the turbine. The blisk 110 is a turbomachine component that includes both a plurality of blades 120 and a rotor disk 130. According to an embodiment, the blisk 110 is a single component, instead of an assembly of a disk and individual, removable blades and may be integrally cast, machined from a solid piece of material, or made by welding individual blades to a rotor disk.

In the example embodiment, the rotor disk 130 includes a metallic central ring 132 and an outer hub 134 that surrounds the central rim 132. For example, the space defined between the outer hub 134 and central ring 132 is a solid metal structure the forms part of the rotor disk 130. Furthermore, the plurality of rotor blades 120 extend radially outward from the outer hub 134 of the rotor disk 130. As shown, for example, the rotor blades 120 are positioned at regularly-spaced intervals about a circumference of the hub 134, with each rotor blade 120 having a substantially airfoil cross-sectional shape. According to an example embodiment, the plurality of rotor blades includes multiple stages (or rings) of rotor blades (e.g., a first stage 122 and a second stage 124) positioned axially along the turbine. It should be appreciated that while only two stages includes rings of rotor blades 122 and 124 (i.e., turbine blisks) are shown in the perspective view of FIG. 1A, in an embodiment, it is contemplated that the turbine has four separate rings of rotor blades provided for a four stage turbine engine as should be appreciated and will be described below.

As shown, the two rotor blade rings 122 and 124 can have opposing airfoil cross-sectional shapes, which will cause the two rings 122 and 124 to rotate in opposite directions (i.e., counter rotation) with respect to each other as hot airflow passes through the plurality of rotor blades 120 during combustion of the engine. This technical effect is possible since the turbine 100 is "shaftless", such that the blades are not coupled to a rotational shaft, and, therefore, forced to all rotate in the same direction as is the case with conventional turbine engines.

As further shown, the rotor disk 130 of blisk 110 includes a second, inner ring 136 that is disposed inside the central ring 132. According to the example embodiment, the central ring 132 can be an iron ring for electromagnetic field entrapment. In addition, a plurality of superconductor magnets 138 are disposed in a circular arrangement between the central ring 132 and inner ring 136. According to the example embodiment, there are six superconductor magnets 138 that are preferably formed from yttrium barium copper oxide ("YBCO") and formed by a racetrack-shaped superconducting wiring. In general, during combustion of the engine and operation of the superconductor magnets 138, the magnet windings must be cooled below their critical temperature, i.e., the temperature at which the winding material changes from the normal resistive state and becomes a superconductor. More specifically, the superconductor magnets 138 must be cooled to cryogenic temperatures during operation, such that in its superconducting state, the wire can conduct much larger electric currents than ordinary wire, creating intense magnetic fields. As should be appreciated to those skilled in the art, the superconductor magnets 138 can produce greater magnetic fields than all but the strongest electromagnets and can be cheaper to operate because no energy is dissipated as heat in the windings. Thus, according to the example embodiment, the rotor disk 130 includes a vacuum chamber (illustrated below in FIG. 2A) that facilitates cooling of the superconductor magnets 138 to cryogenic temperatures.

According to the example embodiment, the blisk 110 and, in particular, the superconductor magnets 138 form the rotor of the electromagnetic system of the power generation system provided by the turbine 100. As further shown, the turbine 100 includes a stator 140 disposed internally to the inner ring 136 of the rotor disk 130. The stator 140 includes a hollow shaft (i.e., it is "shaftless"). Moreover, according to the example embodiment, the stator 140 includes an outer rim 142 with an air gap 150 formed between the outer rim 142 and the inner ring 136 of the rotor disk 130. For example, the air gap 150 is between 1.0 and 5.0 millimeters, and more specifically between 2.5 to 3.0 millimeters. The air gap 150 facilitates the cryostat and insulation for the plurality of superconductor magnets 138.

In addition, the stator 140 includes diamond-shaped copper cryogenic windings 144 that generate electric energy when an electromagnetic field is generated with the superconductor magnets 138 when the blisk 110 is rotated about the stator 140. According to the example embodiment, the copper winding 144 comprises a Leitz wire distribution winding configuration. Moreover, the stator includes a cryogenic pump/cryogenic circuit 146 to facilitate the cooling process of the superconductor magnets 138 as discussed below. Specifically, during operation of the turbine engine when a combustion chamber (upstream) forces hot air through the plurality of rotor blades 120, the blisk 110 rotates around the fixed stator 140 facilitating the electromagnetic field between the superconductor magnets 138 and the copper windings 144. Moreover, as discussed below, both the blisk 110 and the stator 140 include permanent magnets that, during operation of the power generation system, create a repelling force that keeps the rotating component positioned around the stator 140 with the airgap 150 therebetween.

Figure 1B:
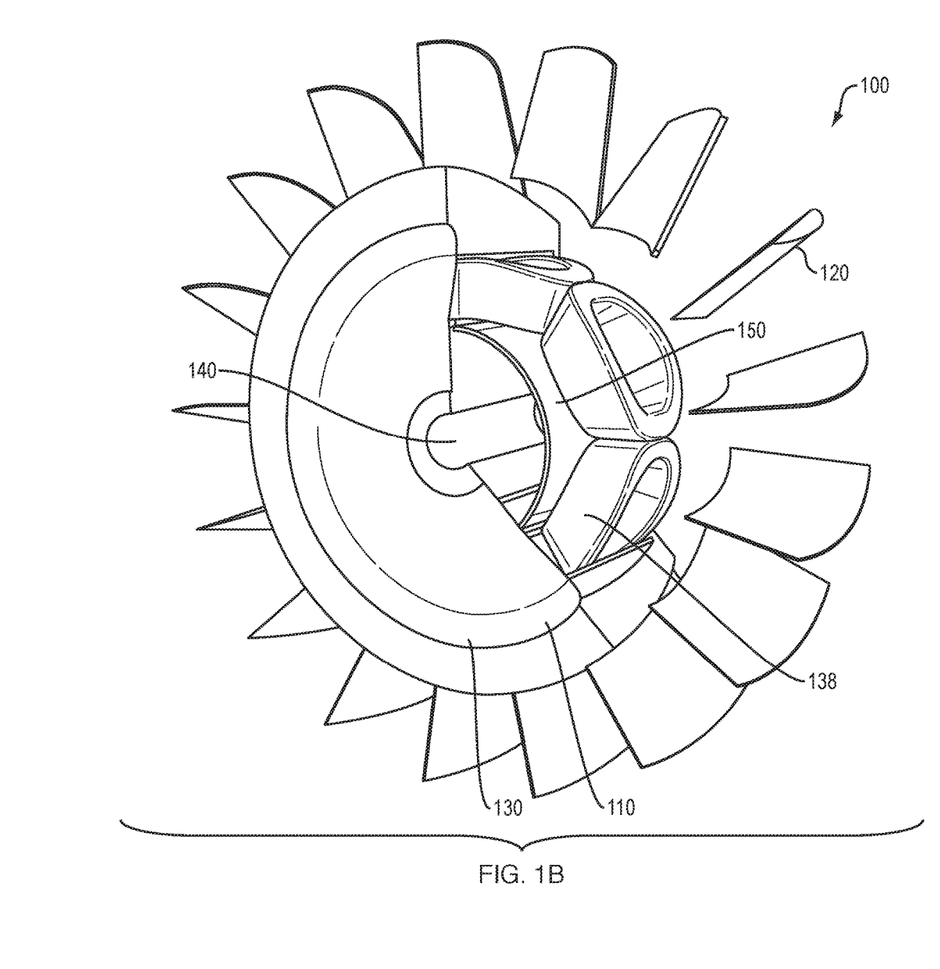

FIG. 1B illustrates another perspective view of the turbine assembly according to an example embodiment of the present invention. The components of the turbine assembly are described above with respect to FIG. 1A and will not be repeated herein.

Figure 2A:
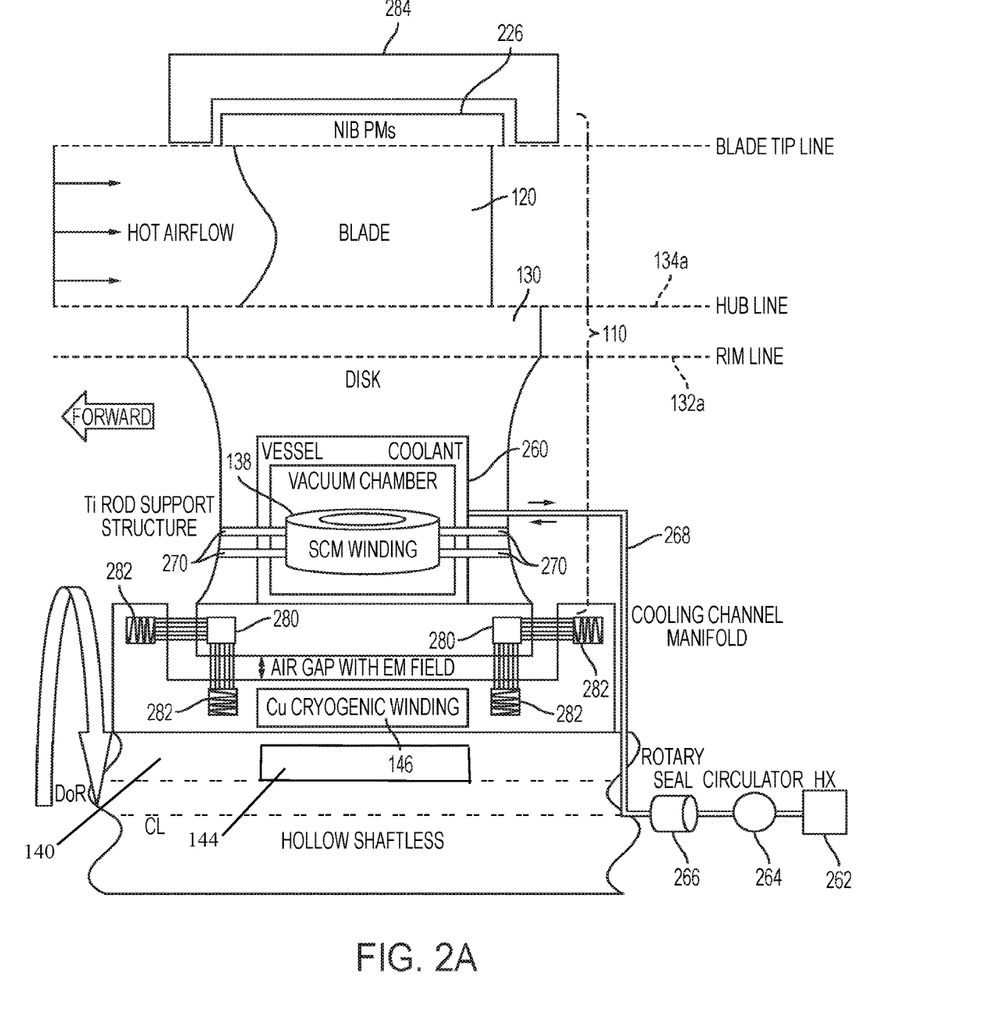
FIG. 2A through 2D illustrate cross-section views of the turbine blisk according to an embodiment of the present invention.

FIG. 2A illustrates a cross-section view of the turbine blisk according to an example embodiment of the present invention. It should be appreciated that the view illustrated in FIG. 2A is a cross section of one of the plurality of rings as noted above. As shown, the turbine 100 includes the blisk 110 that encircles the stator 140 and is rotationally disposed with respect to the stator 140. Moreover, the blisk 120 further includes a rotor disk 130 and one blade 120 of the plurality of blades forming the blisk 110. As shown, the disk 130 includes the outer hub 134 defined by hub line 134a and the central ring 132 defined by rim line 132a. As further described above, the rotor disk 130 includes a superconductor magnet 138 disposed therein.

In an embodiment, during operation of the turbine engine, the magnet windings of the superconductor magnet 138 must be cooled below its critical temperature. Accordingly, the turbine 100 is provided with a vacuum chamber 260 in the rotor disk 130 that is cooled by a cooling system. More particularly, for example, the cooling system includes a heat exchanger 262 ("HX"), a circulator 264, a rotary seal 266 and a cooling channel manifold 268. The cooling system generates coolant during operation to fill the vacuum chamber 260 to ensure the superconductor magnet 138 is cooled below its critical temperature during combustion.

In addition, the blisk 110 includes permanent magnets 226 on the tip of the blades 120 as well as permanent magnets 280 disposed on the base of the disk 130 opposite the permanent magnets 226. In addition, the stator 140 includes a plurality of permanent magnets 282 that can be disposed both on the base of the stator 140 adjacent the copper windings 144 and also on two arms or sleeves (forming a pair of rings) on the outer circumference of the stator 140 extending vertically to enclose the base of the rotor disk 130. In addition, an outer stator ring 284 have be provided of which the tip of the blades is positioned therein. The outer stator ring can also include a plurality of permanent magnets. Permanent magnets 282 are magnetically coupled to permanent magnets 280 when the blisk 110 rotates axially about the stator 140 during operation. Moreover, permanent magnets 226 are magnetically coupled to the outer stator ring during rotation. These coupling of permanents magnets create the repelling force that keeps the rotor positioned around the stator 140 with the airgap 150 therebetween. It should be appreciated that these magnetic couplings enable the design to very accurately suspend the blisk 110 in the specific x, y coordinates with respect to the stator 140 to maximize power and power density.

As further shown, the rotor disk 130 includes a plurality of titanium rod supports that are provided to support or suspend each superconductor magnet 138 in the vacuum chamber 260. During operation, when the blisk 110 rotates about the stator 140, a second electromagnetic field is generated between the superconductor magnets 138 and the diamond-shaped copper cryogenic windings 144. The electricity generated by the stator 140, which is due to this electromagnetic coupling between the superconductor magnets 138 and the copper windings 144, can then be supplied to other components or stages of the turbine engine, such as the compressor, for example. The details of the other stages of the turbine engine are note described herein in detail so as to not obscure the aspects of the invention.

Figure 2B:
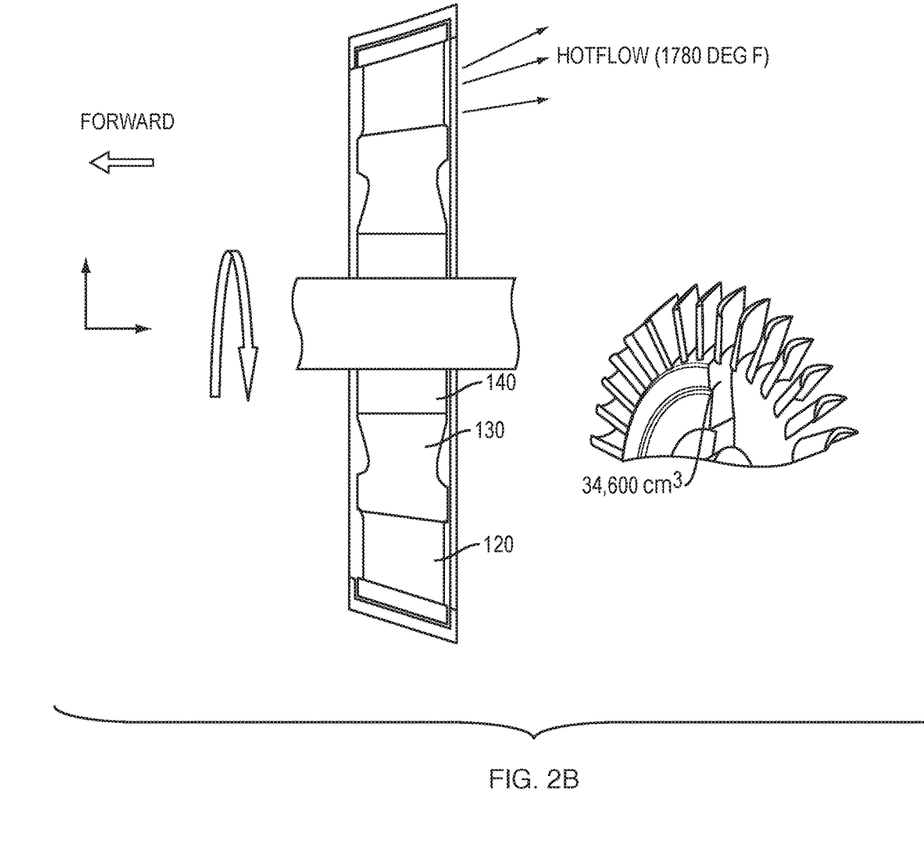
Figure 2C:
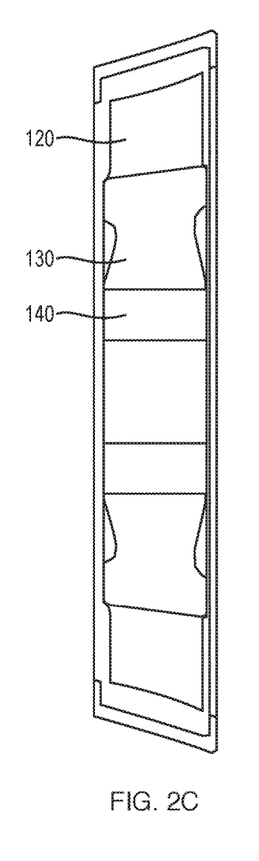
Figure 2D:
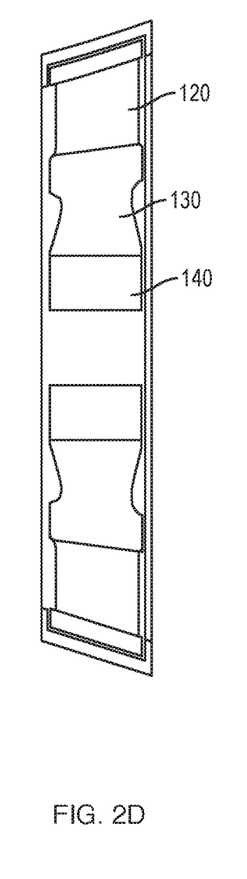

FIGS. 2B through 2D illustrate additional cross-section views of a stage of the of the turbine 100 according to an example embodiment of the present invention. In particular, as shown in FIG. 2B, the blisk (including the plurality of blades and rotor disk) encircles the stator and is rotatably positioned with respect to the stator. Moreover, as further shown, an outer stator ring is provided adjacent the tips of the plurality of blades and facilitates the magnetic suspension of the blisk with respect to the stator.

Figure 3A:
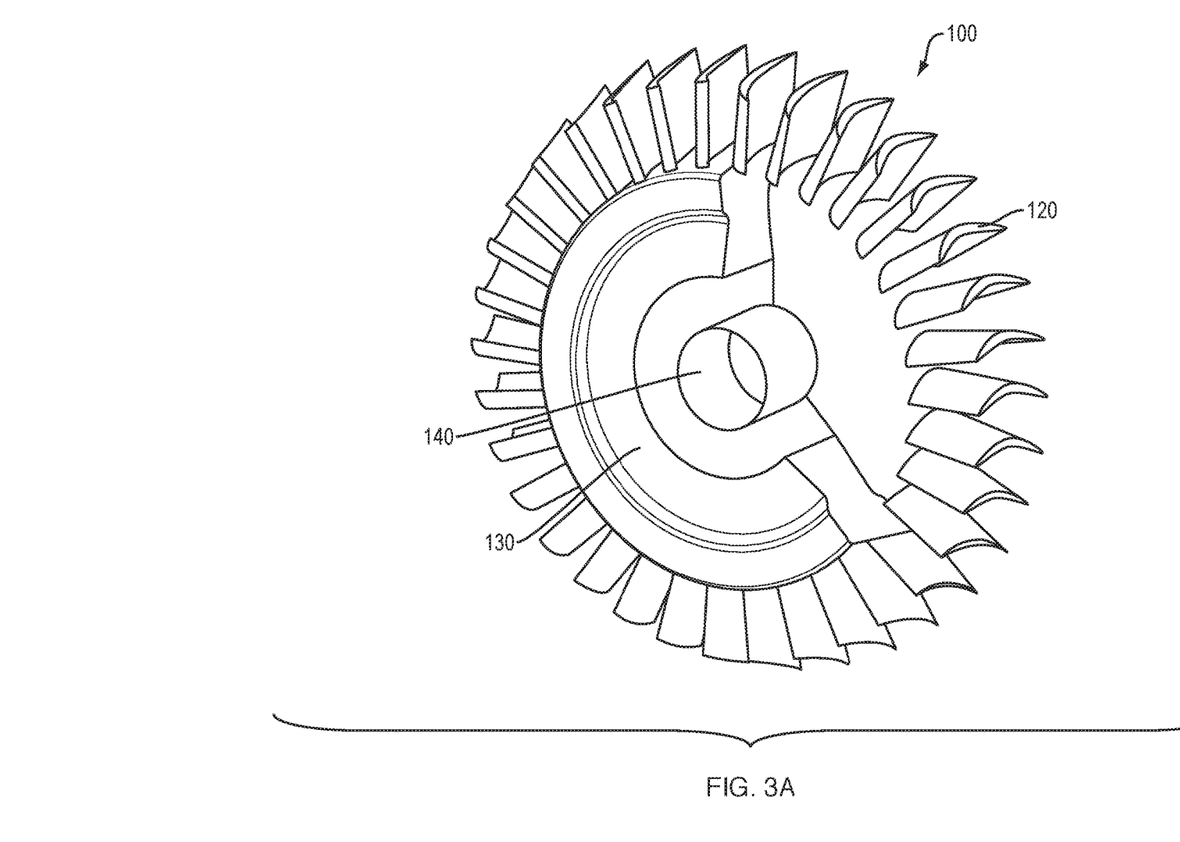
FIG. 3A illustrates a perspective view of one stage of the turbine blisk according to an embodiment of the present invention that includes example dimensions of the components.

FIG. 3A illustrates a perspective view of one stage of the turbine 100 according to an example embodiment of the present invention that includes example dimensions of the components. As shown, the total diameter of the turbine 100 can be approximately 218 inches and the total diameter of the rotor disk can be approximately 24.8 inches. Moreover, each of the blades of the plurality of blades 120 can have a height of approximately 5.54 inches and the stator can have a diameter of approximately 12.1 inches. As further shown, according to the example embodiment, the hollow shaft can have a diameter of approximately 6.0 includes and a length of approximately 8.86 inches. Moreover, the air gap 150 between the stator 140 and the rotor disk 130 can be approximately 0.08 inches, which is equal to approximately 2.0 millimeters, as noted above. It should be appreciated that these dimensions are provided according to the example embodiment to maximize power and power density under certain conditions, but that the invention should in no way be limited to such dimensions.

Figure 3B:
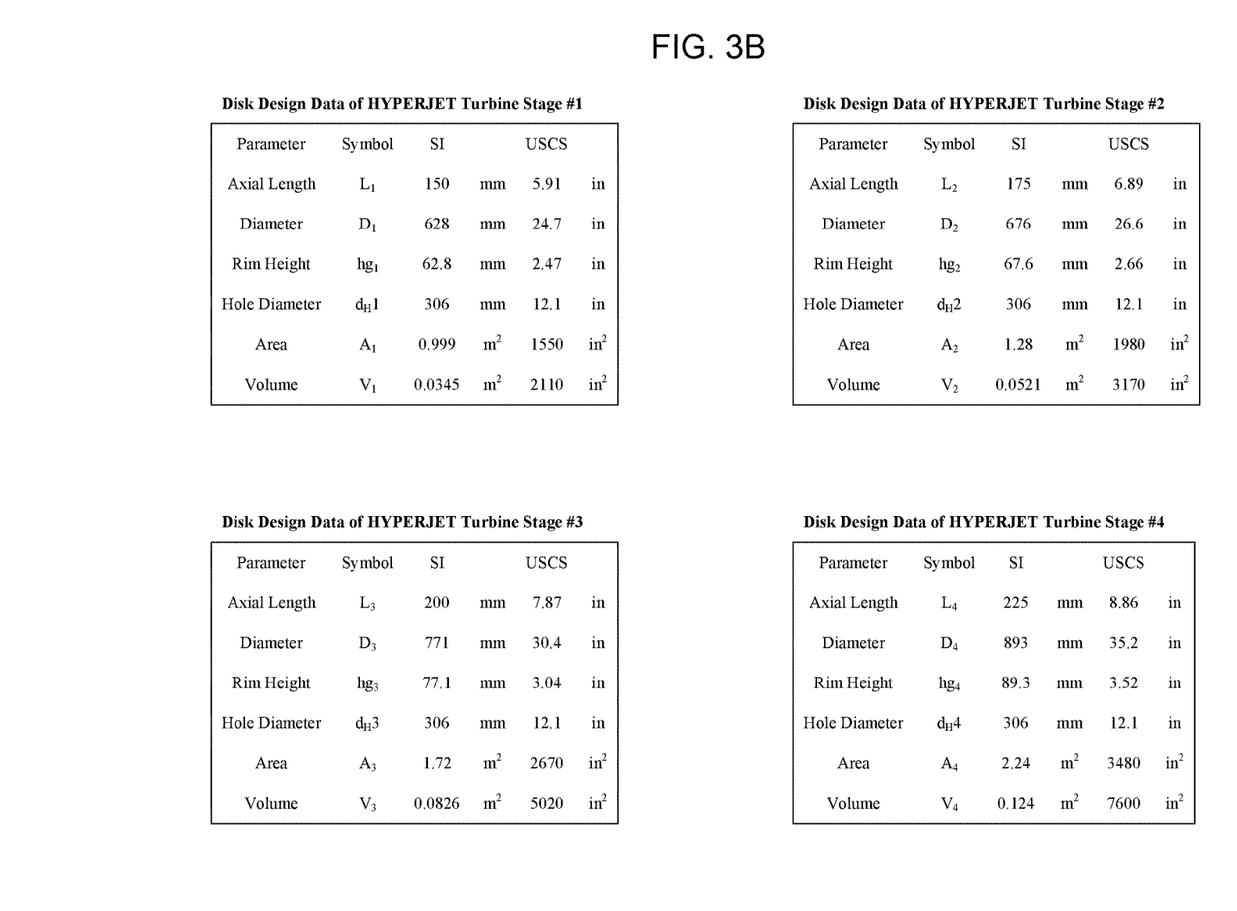
FIG. 3B illustrates a table providing a listing of dimensions for each of the four stages of the turbine assembly according to an embodiment of the present invention.

Moreover, FIG. 3B illustrates a table providing a listing of dimensions for each of the four stages of the turbine assembly according to an example embodiment.

Figure 4:
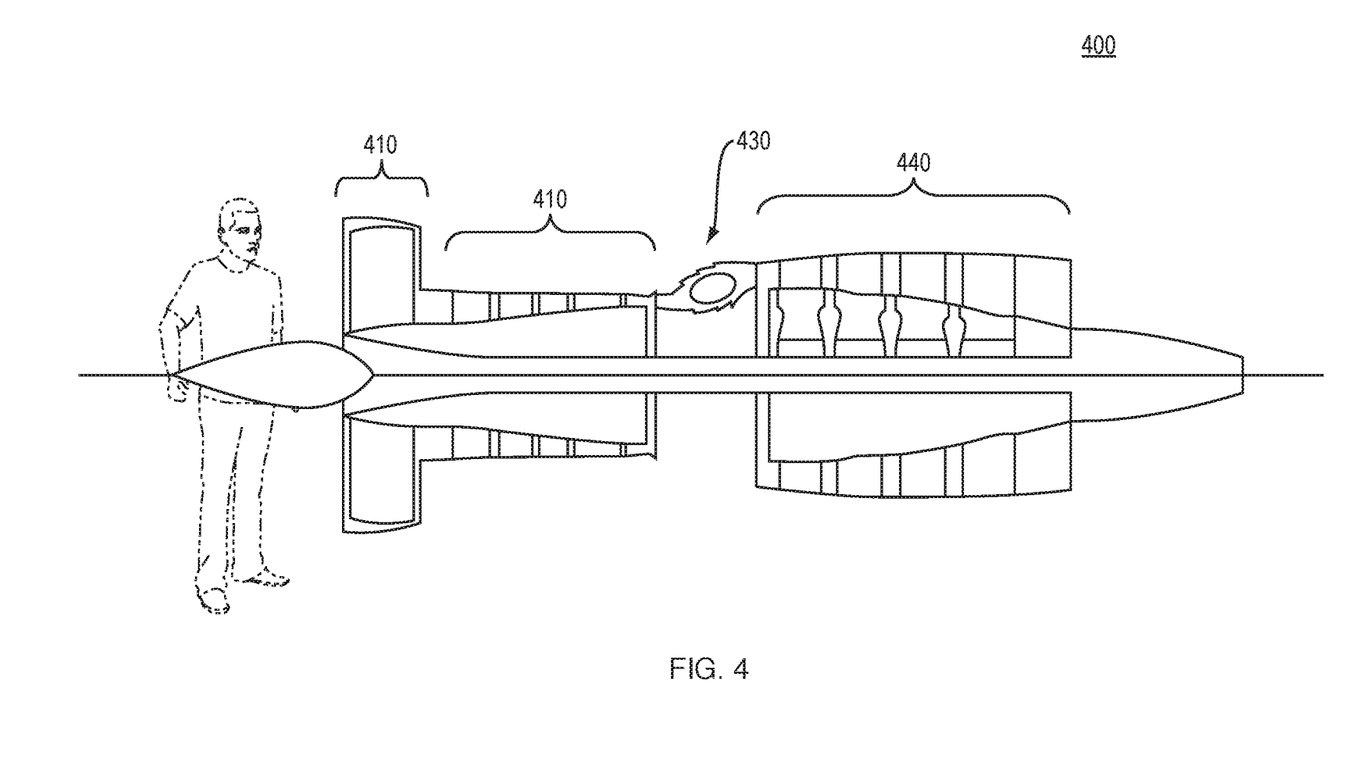
FIG. 4 illustrates a three-dimensional view of the power generation system according to art embodiment of the present invention.

FIG. 4 illustrates a three-dimensional view of the power generation system according to an example aspect of the present invention. As described above, the system is for Hyperjet™ superconducting turbine blisk propulsion and power generation. As shown in FIG. 4, the system 400 (i.e., the engine) includes an intake 410, a compressor 420, a combustor 430 and the turbine assembly 440 including the plurality of blisks as described above.

The operation of gas turbine engines are well known to those skilled in the art and will not be described in detail. However, in general, air enters the intake 410 and is fed to the compressor 420. The compressor 420 can consists of numerous compressor stages, each of which is made up of a rotor and a diffuser, the number of stages dependent upon the total pressure ratio increase required to achieve combustion and produce the desired thrust. Moreover, as described above, the rotor of the compressor 420 can be is a series of rotating airfoil blades, or fans (attached to the shaft), which converge the air, i.e., compressing the volume, of air and increasing its velocity, on the intake side of the blade, by passing it into a smaller volumes (convergent channels between airfoil rotor blades) in each the rotor chamber. Adjacent to each rotor is a diffuser (or stator). The diffuser is a fixed, non-rotating disc of airfoil stators whose sole purpose is to reduce the air velocity from the rotor and increase the pressure. The diffuser slows the air down by passing it through divergent (expanding) channels between the airfoil stators, thus recovering the pressure. Upon entering the diffuser the air passes from a narrow opening on the intake side of the diffuser into a gradually enlarging chamber (diffuser) that slows the velocity and raises the pressure of the air. Each compressor stage is made up of a compressor rotor and a diffuser (stator) disc.

The compressor 420 then feeds the compressed air to the combustor 430. In the combustor, the high pressure, high temperature, expanding air mixes in a swirl of hot vaporized fuel and ignites to form a controllable flame front. The flame front expands as it combusts, rotating and driving the turbine blades (e.g., the plurality of blades 120, described above) as the flame front exits the engine.

According to the example embodiment of the invention, the turbine assembly 440 includes four stages of blisks each having a structural configuration as described above with respect to FIG. 1 and FIG. 2, for example. Thus, as described above, each stage of the turbine assembly 440 can generate electricity based on the electromagnetic field created between the superconductor magnets 138 disposed in each rotor disk 130 and the copper cryogenic windings 144 disposed in the stator 140. Although not shown in FIG. 4, the electricity can be provided to supply the other components of the jet engine, including the magnets used to drive the compressor 420, for example.

Figure 5A:
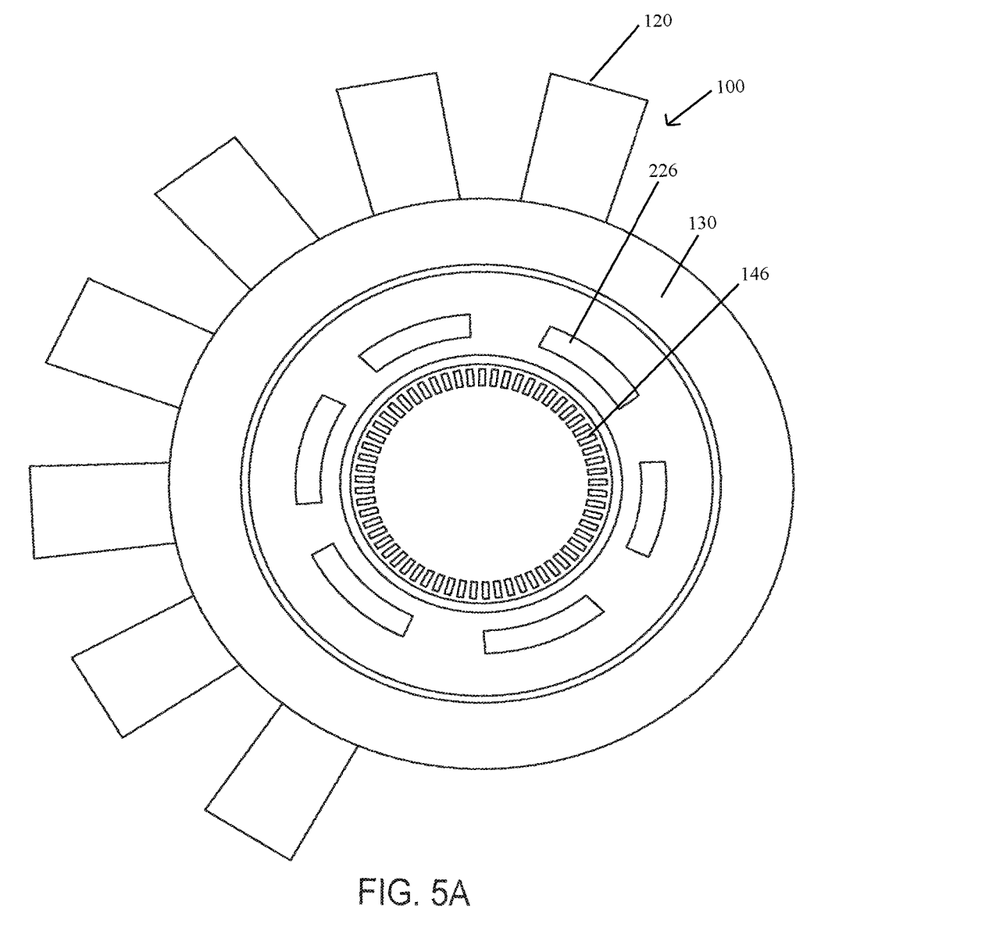
FIGS. 5A through 5C illustrate plan views of the turbine blisk (according to an embodiment of the present invention.
Figure 5B:
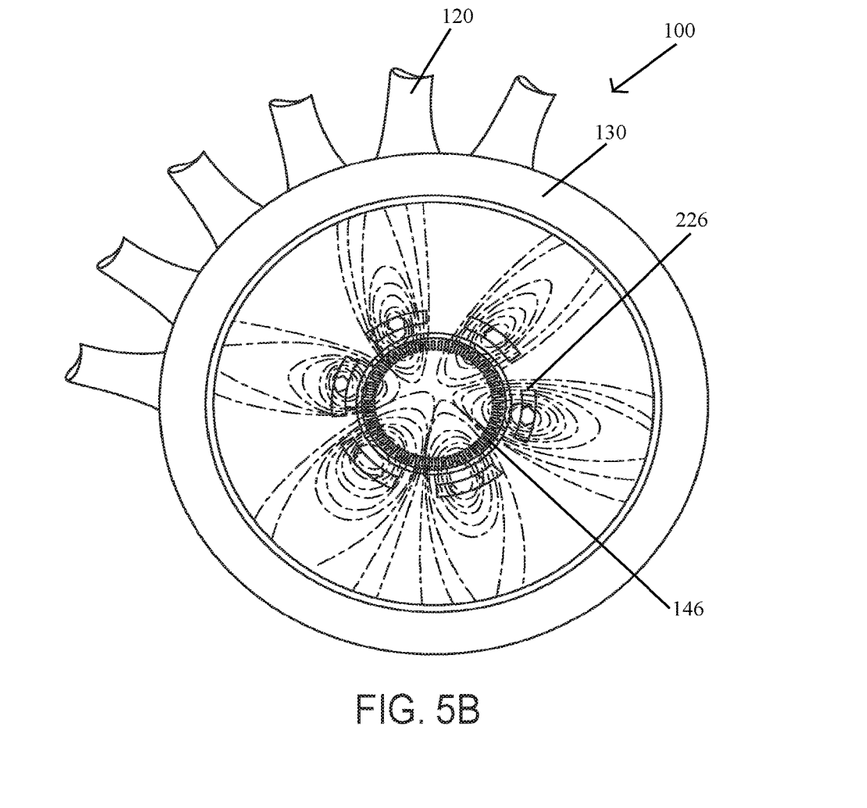
Figure 5C:
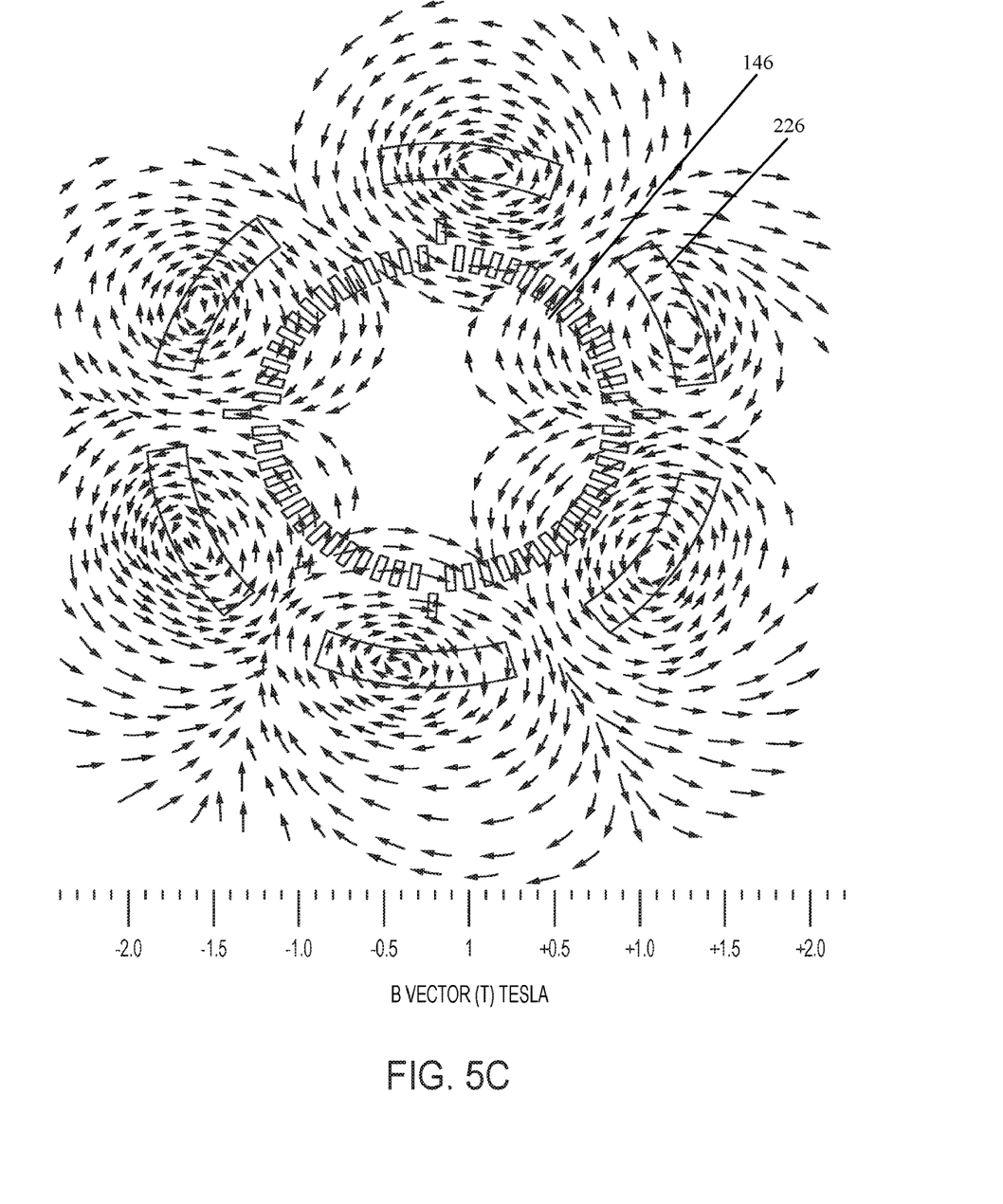

FIGS. 5A through 5C illustrate plan views of the turbine blisk according to an example embodiment of the present invention. As shown in FIG. 5A, the turbine blisk includes six superconducting magnets equidistantly spaced around the stator as described above. As shown in the example embodiment, the height of the winding of the stator can be approximately 0.4 meters and the radius from the center of the stator to the outer surface of the superconducting magnets can be approximately 0.3 meters. It should be appreciated that a pair of superconducting magnets can form a pair of 3-pole superconductors. Moreover, with the Leitz wire distributed winding, the turbine assembly can provide 2 layers, with three phases, no iron used for the assembly, 3 "slots"/pole phase, 4 A/mm$^2$ in copper, and no liquid cooling.

FIG. 5B illustrates another plan view and includes a depiction of the flux lines generated by the six superconducting magnets in the rotor disk. FIG. 5B contemplates a Hyperjet™ single stage operation at 77 degrees Kelvin at 40,000 RPMs at between 7,50,000 to 3,000,000 watts. Moreover, the inputs can be considered to be the rotor winding thickness and the YBCO superconducting magnets can have a filling factor of 0.7 and operating factor of 0.7. Moreover, the outputs can include torque, length of the superconductor, and active length for 1 MW.

FIG. 5C illustrates the magnetic induction field flow of the Hyperjet™ during operation.

The modifications listed herein and other modifications may be made by those in the art without departing from the ambit of the invention. Although the invention has been described above with reference to specific embodiments, the invention is not limited to the above embodiments and the specific configurations shown in the drawings. For example, some components shown can be combined with each other as one embodiment, and/or a component can be divided into several subcomponents, and/or any other known or available component may be added. The operation processes are also not limited to those shown in the examples. Those skilled in the art will appreciate that the invention can be implemented in other ways without departing front the substantive features of the invention. For example, features and embodiments described above can be combined with and without each other. The present embodiments are therefore to be considered in all respects as illustrative and not restrictive. Other embodiments may be utilized and derived therefrom, such that structural and logical substitutions and changes can be made without departing from the scope of this disclosure. This Specification, therefore, is not to be taken in a limiting sense, along with the full range of equivalents to which such claims are entitled. Embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations and/or variations of various embodiments. Combinations of the above embodiments, and other embodiments not specifically described herein, will be apparent to those of ordinary skill in the art upon reviewing the above description.

What is claimed is:

1. A power generation system for a shaftless turbine engine, the system comprising:
   a stator having a wire distributed winding;
   a shaftless rotatable blisk encircling the stator with an air gap disposed there between, the rotatable blisk including a rotor disk and a plurality of blades extending radially outward from the rotor disk, wherein heated air output from a combustor is forced through the plurality of blades, and wherein the rotor disk includes a plurality of superconducting magnets disposed in a circular arrangement within the rotor disk to encircle the stator;
   a vacuum chamber included in the rotor disk, the vacuum chamber encapsulating the superconducting magnets; and
   a cooling system comprising a heat exchanger, a circulator, a rotary seal, and a cooling channel manifold, the cooling channel manifold configured to provide a coolant to be injected into the vacuum chamber to cool the plurality of superconducting magnets to a temperature below a critical temperature of the superconducting magnets.

2. The power generation system according to claim 1, wherein each blade of the plurality of blades comprises an airfoil cross-sectional shape such that the rotatable blisk rotates about the stator when the heated air output from the combustor is forced through the plurality of blades.

* * * * *